(12) United States Patent
Bailey et al.

(10) Patent No.: US 8,484,978 B2
(45) Date of Patent: Jul. 16, 2013

(54) FUEL NOZZLE ASSEMBLY THAT EXHIBITS A FREQUENCY DIFFERENT FROM A NATURAL OPERATING FREQUENCY OF A GAS TURBINE ENGINE AND METHOD OF ASSEMBLING THE SAME

(75) Inventors: Donald Mark Bailey, Simpsonville, SC (US); Scott Robert Simmons, Simpsonville, SC (US); Marcus Byron Huffman, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 758 days.

(21) Appl. No.: 12/617,085

(22) Filed: Nov. 12, 2009

(65) Prior Publication Data

US 2011/0107764 A1 May 12, 2011

(51) Int. Cl.
*F02C 1/00* (2006.01)
(52) U.S. Cl.
USPC .............................. 60/740; 60/737
(58) Field of Classification Search
USPC ........................... 60/737, 740, 748
See application file for complete search history.

(56) References Cited

U.S. PATENT DOCUMENTS

| | | | |
|---|---|---|---|
| 4,258,544 A | 3/1981 | Gebhart et al. | |
| 5,307,635 A | 5/1994 | Graves et al. | |
| 6,672,073 B2 * | 1/2004 | Wiebe | 60/796 |
| 6,761,035 B1 | 7/2004 | Mueller | |
| 6,926,496 B2 | 8/2005 | Ackermann et al. | |
| 2005/0039460 A1* | 2/2005 | Sobieski et al. | 60/772 |
| 2006/0026966 A1* | 2/2006 | Moraes | 60/796 |
| 2007/0277530 A1* | 12/2007 | Dinu et al. | 60/772 |
| 2008/0053062 A1 | 3/2008 | Tuttle | |
| 2008/0072602 A1 | 3/2008 | Wasif et al. | |
| 2008/0105237 A1 | 5/2008 | Gandza | |
| 2009/0129967 A1* | 5/2009 | Goller | 420/38 |

* cited by examiner

*Primary Examiner* — Gerald L Sung
(74) *Attorney, Agent, or Firm* — Armstrong Teasdale LLP (57) ABSTRACT

A method of assembling a fuel nozzle assembly for a gas turbine engine having a natural operating frequency includes providing a flange and providing a premix tube. The flange is fabricated from a first alloy such that the flange is configured to exhibit a first frequency that is different than the natural operating frequency of the gas turbine engine. The premix tube is fabricated from a second alloy such that the premix tube is configured to exhibit a second frequency that is different from the natural operating frequency of the gas turbine engine. The premix tube is coupled to the flange.

14 Claims, 6 Drawing Sheets

FIGURE 6 ic # FUEL NOZZLE ASSEMBLY THAT EXHIBITS A FREQUENCY DIFFERENT FROM A NATURAL OPERATING FREQUENCY OF A GAS TURBINE ENGINE AND METHOD OF ASSEMBLING THE SAME

BACKGROUND OF THE INVENTION

The field of the invention relates generally to gas turbine engines and, more particularly, to center fuel nozzles used within gas turbine engines.

At least some known gas turbine engines ignite a fuel-air mixture in a combustor to generate a combustion gas stream that is channeled to a turbine via a hot gas path. Compressed air is channeled to the combustor by a compressor. Combustor assemblies typically use fuel nozzles that facilitate fuel and air delivery to a combustion region of the combustor. The turbine converts the thermal energy of the combustion gas stream to mechanical energy that rotates a turbine shaft. The output of the turbine may be used to power a machine, for example, an electric generator or a pump.

Known fuel nozzle assemblies include a flange that extends from an end cover that serves as the structural base of the fuel nozzle. A premix tube extends from the flange and is coupled to a swirler. The natural frequency of the fuel nozzle assemblies are generally a function of both the shape and length of the flange and premix tube combination. Moreover, in known fuel nozzle assemblies, the operating frequency of the gas turbine engine may produce low cycle and/or high cycle fatigue in fuel nozzle components and joints, such as for example, the flange, the premix tube, and/or the swirler, and/or joints defined between the components. Moreover, in known fuel nozzle assemblies, stress concentrations around the fuel nozzle assembly and/or an increase in structural break-out into the fuel holes as a result of the fuel nozzle assembly may develop if the natural frequency is similar to, or substantially the same as, the operating rotor frequency (including first through fourth multiple of rotor frequency), combustion tones and siren tones of the gas turbine engine.

Many known fuel nozzle assemblies use a variety of components that are manufactured from a variety of materials and that are coupled together with welded and brazed joints, such as along the joints defined between the flange, the premix tube and/or the swirler. Because of the different material properties, the different components may have different thermal growth rates and/or magnitudes of thermal expansion and contraction. Additionally, over time, the welded and brazed joints may be prone to fatigue, cracking, or premature failure during operation when exposed to the operating frequencies produced by the gas turbine engine.

BRIEF DESCRIPTION OF THE INVENTION

In one aspect, a method is provided for assembling a fuel nozzle assembly for a gas turbine engine having a natural operating frequency. The method includes providing a flange and a premix tube. The flange is fabricated from a first alloy such that the flange is configured to exhibit a first frequency that is different than the natural operating frequency of the gas turbine engine. The premix tube is fabricated from a second alloy such that the premix tube is configured to exhibit a second frequency that is different from the natural operating frequency of the gas turbine engine. The premix tube is coupled to the flange.

In another aspect, a fuel nozzle assembly is provided for a gas turbine engine including a combustor. The gas turbine engine has a natural operating frequency. The fuel nozzle assembly includes a flange and a premix tube. The flange includes a first end and a second end. The flange first end is coupled to the combustor. The flange is fabricated from a first alloy such that the flange is configured to exhibit a first frequency that is different than the natural operating frequency of the gas turbine engine. The premix tube includes a first end coupled to the flange second end. The premix tube is fabricated from a second alloy such that the premix tube is configured to exhibit a second frequency that is different than the natural operating frequency of the gas turbine engine.

In yet another aspect, a gas turbine engine is provided. The gas turbine engine has a natural operating frequency. The gas turbine engine includes a combustor and a fuel nozzle assembly. The fuel nozzle assembly includes a flange and a premix tube. The flange includes a first end and a second end. The flange is fabricated from a first alloy such that the flange is configured to exhibit a first frequency that is different than the natural operating frequency of the gas turbine engine. The flange is coupled to the combustor at the flange first end. The premix tube includes a first end coupled to the flange second end. The premix tube is fabricated from a second alloy such that the premix tube is configured to exhibit a second frequency that is different than the natural operating frequency of the gas turbine engine.

Various refinements exist of the features noted in relation to the above-mentioned aspects of the present invention. Additional features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION OF THE INVENTION

Figure 1:
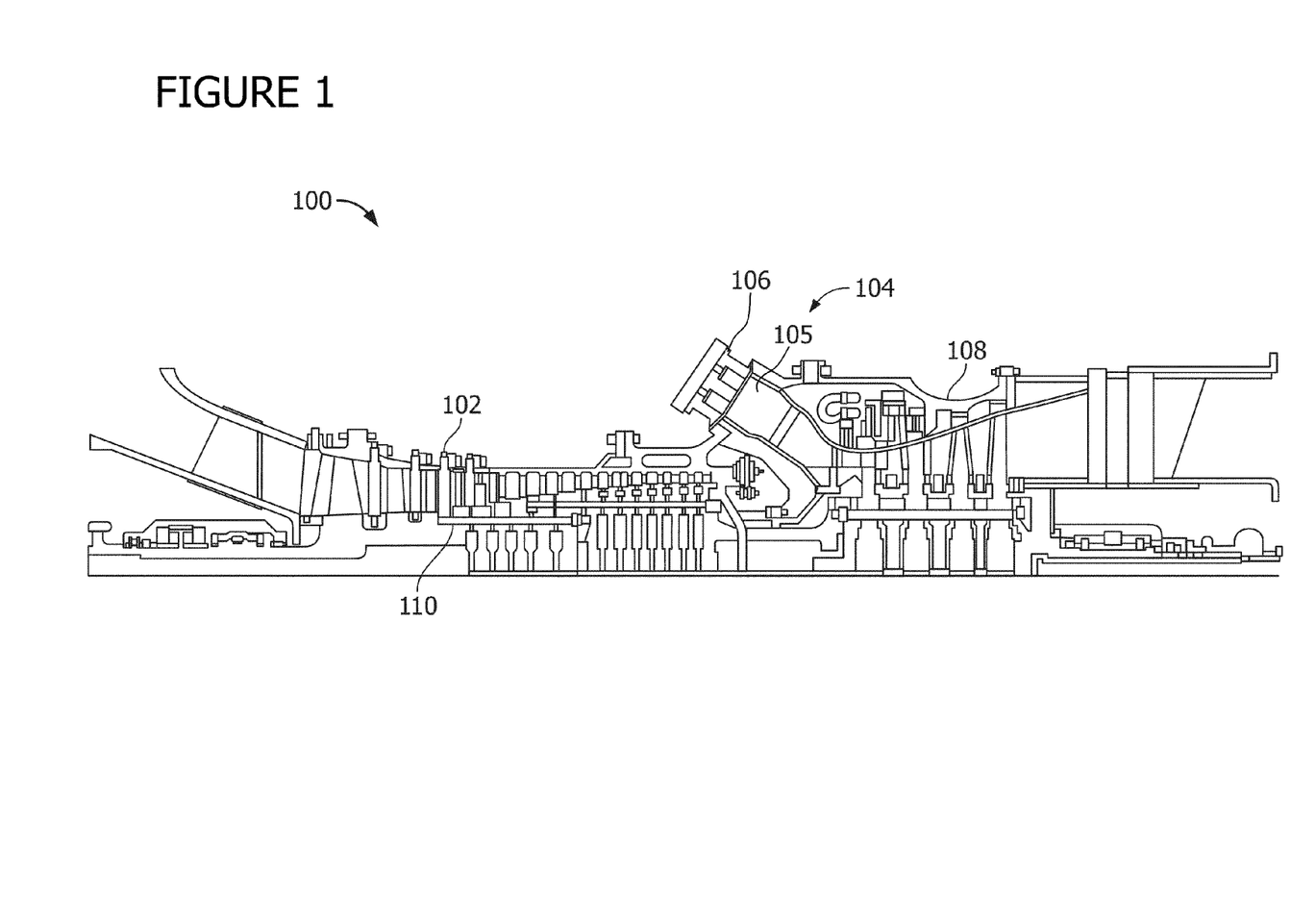
FIG. 1 is a schematic illustration of an exemplary combustion turbine engine.

FIG. 1 is a schematic illustration of an exemplary gas turbine engine 100. In the exemplary embodiment, engine 100 includes a compressor 102 and a combustor 104. Combustor 104 includes a combustion region 105 and a fuel nozzle assembly 106. Engine 100 also includes a turbine 108 and a common compressor/turbine shaft 110 (sometimes referred to as rotor 110). Compressor 102 also is rotatably coupled to rotor 110. In the exemplary embodiment, there is a plurality of combustors 104 and fuel nozzle assemblies 106. In the following discussion, unless otherwise indicated, only one of each component will be discussed. In one embodiment, gas turbine engine 100 is a PG9371 9FBA Heavy Duty Gas Turbine Engine commercially available from General Electric Company, Schenectady, N.Y. Notably, the present invention is not limited to any one particular engine and may be used in connection with other gas turbine engines, for example, such as the MS7001FA (7FA), MS9001FA (9FA), MS7001FB (7FB) and MS9001FB (9FB) engine models commercially available from General Electric Company, Schenectady, N.Y.

During operation, air flows through compressor 102 and compressed air is supplied to combustor 104. Specifically, a substantial amount of the compressed air is supplied to fuel nozzle assembly 106 that is integral to combustor 104. Some combustors have at least a portion of air flow from compressor 104 distributed to a dilution air sub-system (not shown in FIG. 1) and most combustors have at least some seal leakage. Fuel nozzle assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel, for example, natural gas and/or fuel oil, to generate a high temperature combustion gas stream. Combustor 104 is coupled in flow communication with turbine 108 and turbine 108 converts thermal energy from the combustion gases discharged by Combustor 104 to mechanical rotational energy. Turbine 108 is rotatably coupled to rotor 110.

Figure 2:
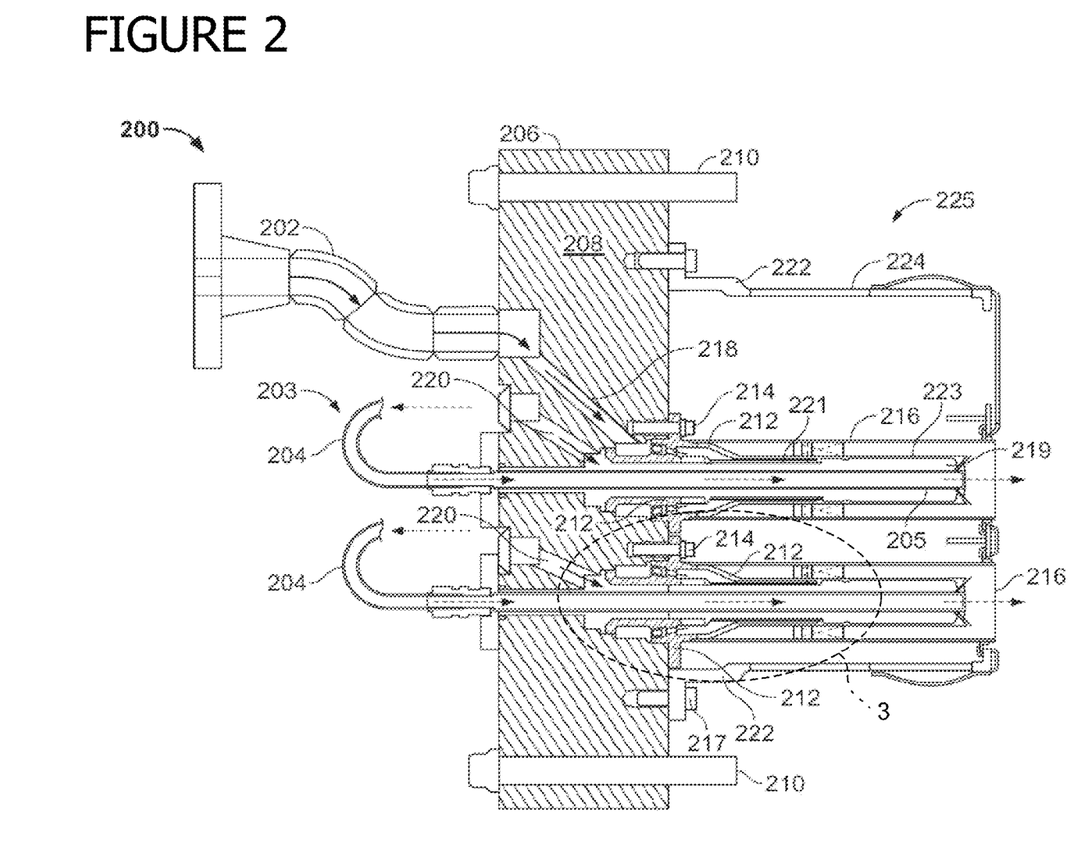
FIG. 2 is a fragmentary illustration of an exemplary fuel delivery system that may be used with the combustion turbine engine in FIG. 1.

FIG. 2 is a fragmentary illustration of an exemplary fuel delivery assembly 200 that may be used with turbine engine 100 (shown in FIG. 1) as a component of combustor 104 (shown in FIG. 1). In the exemplary embodiment, fuel delivery assembly 200 includes at least one fuel supply feed 202 and an atomized air cartridge sub-assembly 203. Sub-assembly 203 includes a plurality of air supply tubes 204 that are coupled to a plurality of inner atomized air tubes 205. Fuel nozzle assembly 200 also includes a combustor end cover sub-assembly 206. Cover sub-assembly 206 includes a plurality of premix fuel supply passages 218 for channeling air and fuel (discussed further below), an end cover plate body 208, and a plurality of end cover-to-combustor casing fasteners 210. In the exemplary embodiment, body 208 is formed via a machining process wherein a plurality of channels 211 are formed within body 208 that are sized to receive, but are not limited to only receiving, premix fuel supply passages 218, a diffusion fuel supply passage 220, a plurality of atomized air supply tubes 204, a fuel nozzle insert sub-assembly 212, a plurality of end cover-to-combustor casing fasteners 210, a plurality of insert-to-end cover fasteners 214, and a plurality of cap-to-end cover fasteners 217. Alternatively, an existing body 208 may be retrofitted in accordance with the teachings described here. In the exemplary embodiment, cover sub-assembly 206 is coupled to combustor 104 (shown in FIG. 1) casings via fasteners 210, and atomizing air cartridge sub-assemblies 203 are coupled to end cover plate body 208.

Fuel delivery assembly 200 also includes a plurality of fuel nozzle insert sub-assemblies 212 and a fuel nozzle sub-assembly 225. Fuel nozzle sub-assembly 225 includes a plurality of nozzle radially outer tubes 216, a plurality of intermediate tubes 223, a cap mounting flange 222, and a plurality of radially inner tubes 221, an annular diffusion fuel passage 219 and a fuel nozzle cap 224. In the exemplary embodiment, fuel nozzle insert sub-assembly 212 is coupled to end cover plate body 208 via fasteners 214, and a cap 224 is coupled to end cover plate body 208 via fasteners 217 and cap mounting flange 222.

During operation, fuel is channeled to fuel nozzle assembly 200 via at least one supply feed 202 from a fuel source (not shown in FIG. 2). Premix fuel is channeled to tube 216 via passage 218 and fuel nozzle insert sub-assembly 212 as illustrated by arrows. Diffusion fuel is channeled to passage 219 via tube 220 as illustrated by arrows. Combustion air is channeled from compressor 102 (shown in FIG. 1) to air supply tubes 204 prior to being channeled to tube 205 as illustrated by arrows. Generally, a plurality of fuel nozzle assemblies 200 are spaced circumferentially about rotor 110 (shown in FIG. 1) to ensure a circumferential stream of combustion gases, with a substantially uniform temperature is generated within combustor 104 and channeled to turbine 108 (shown in FIG. 1). A portion of fuel nozzle assembly 200, including insert sub-assembly 212, as illustrated within the dotted lines, is illustrated in FIG. 3 and described in more detail below.

Figure 3:
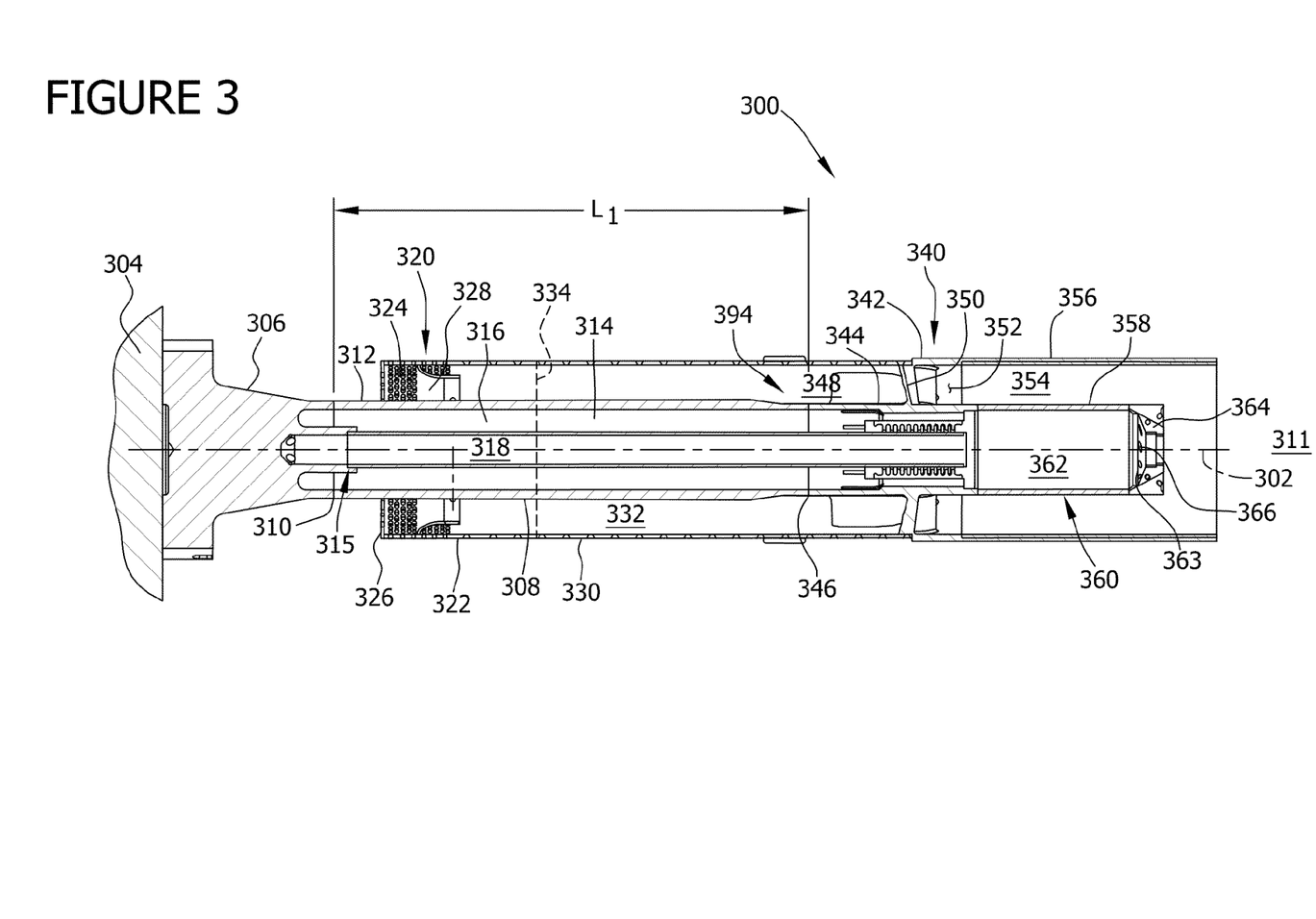
FIG. 3 is a cross-sectional schematic view of an exemplary fuel nozzle assembly that may be used with the combustor shown in FIG. 1.

FIG. 3 is an enlarged cross-sectional schematic view of an exemplary fuel nozzle assembly 300. In the exemplary embodiment, fuel nozzle assembly 300 has a centerline axis 302 and is coupled to an end cover 304 via a fuel nozzle flange 306. A premix tube 308 coupled to flange 306 at a first joint 310 includes a radially outer surface 312. In the exemplary embodiment, premix tube 308 is coupled to flange 306 via a weld such as, but not limited to, an electron beam weld. Alternatively, premix tube 308 may be coupled to flange 306 using any coupling device, such as, for example, a braze, screws, bolts, and/or any fastener that enables fuel nozzle assembly 300 to function as described herein. Premix tube 308 extends a variable length $L_1$ from joint 310 towards a combustion chamber 311. In the exemplary embodiment, length $L_1$ is manipulated to properly tune the natural frequency of fuel nozzle assembly 300, wherein flange 306 and the premix tube assembly operate at a natural frequency that is different than an operating rotor frequency (including first through fourth multiple of rotor frequency), combustion tones and siren tones of the gas turbine engine 100 (shown in FIG. 1).

Fuel nozzle assembly 300 includes a radially inner tube 314 that is coupled to flange 306 along a second joint 315. Tubes 308 and 314 define a substantially annular first premixed fuel supply passage 316. Additionally, inner tube 314 defines a diffusion fuel passage 318. In the exemplary embodiment, passages 316 and 318 are coupled in flow communication to a plurality of fuel sources (not shown in FIG. 3).

Fuel nozzle assembly 300 includes a substantially annular inlet flow conditioner (IFC) 320. In the exemplary embodiment, IFC 320 includes a radially outer wall 322 that includes a plurality of perforations 324, and an end wall 326 that is positioned on an aft end of IFC 320 and extends between wall 322 and surface 312. Walls 322 and 326, and surface 312 define a substantially annular IFC chamber 328 therebetween. Chamber 328 is in flow communication with a cooling passage (not shown in FIG. 3) via perforations 324. Fuel nozzle assembly 300 also includes a tubular transition member 330 that is coupled to wall 322. Transition member 330 defines a substantially annular transition chamber 332 that is substantially concentrically aligned with respect to first premixed fuel supply passage 316 and that is positioned such that an IFC outlet passage 334 extends between chambers 328 and 332.

In the exemplary embodiment, fuel nozzle assembly 300 also includes an air swirler assembly or swozzle assembly 340 for use with gaseous fuel injection. Swozzle 340 includes a substantially tubular shroud 342 that is coupled to transition member 330, and a substantially tubular hub 344 that is coupled to tube 308 along a joint 346. In the exemplary embodiment, hub 344 is coupled to tube 308 via an electron beam weld. Alternatively, hub 344 may be coupled to tube 308 using any coupling device, such as for example, a braze, screws, bolts, and/or any fastener that enables fuel nozzle assembly 300 to function as described herein. Shroud 342 and hub 344 define an annular chamber 348 therebetween, wherein a plurality of hollow turning vanes 350 extend between shroud 342 and hub 344. Chamber 348 is coupled in flow communication with chamber 332, and hub 344 includes a plurality of turning vane passages (not shown in FIG. 3) that are in flow communication with premixed fuel supply passage 316. A plurality of premixed gas injection ports (not shown in FIG. 3) are defined within hollow turning vanes 350.

Fuel nozzle assembly 300 includes a substantially annular fuel-air mixing passage 354 that is defined by a tubular shroud extension 356 and by a tubular hub extension 358. Passage 354 is coupled in flow communication with chamber 352, and extensions 356 and 358 are each coupled to shroud 342 and to hub 344, respectively.

A tubular diffusion flame nozzle assembly 360 is coupled to hub 344 such that an annular diffusion fuel passage 318 is at least partially defined. Assembly 360 also defines an annular air passage 362 in cooperation with hub extension 358. Fuel nozzle assembly 300 also includes a slotted gas tip 363 that is coupled to hub extension 358 and to assembly 360. Tip 363 includes a plurality of gas injectors 364 and air injectors 366, and coupled in flow communication with, and facilitates fuel and air mixing in, combustion chamber 311.

During operation, fuel nozzle assembly 300 receives compressed air from air supply tube 204 (shown in FIG. 2) via a plenum (not shown in FIG. 3) surrounding fuel nozzle assembly 300. Most of the air used for combustion enters assembly 300 via IFC 320 and is channeled to premixing components. Specifically, air enters IFC 320 via perforations 324 and mixes within chamber 328, and air exits IFC 320 via passage 334 and enters swozzle inlet chamber 348 via transition piece chamber 332. A portion of high pressure air entering air supply tube 204 is also channeled into an air-atomized liquid fuel cartridge (not shown in FIG. 3) inserted within diffusion fuel passage 318.

Fuel nozzle assembly 300 receives fuel from a fuel source (not shown in FIG. 3) via premixed fuel supply passage 316. Fuel is channeled from premixed fuel supply passage 316 to the plurality of primary gas injection ports defined within turning vanes 350.

Air channeled into swozzle inlet chamber 348 from transition piece chamber 332 is swirled via turning vanes 350 prior to being mixed with fuel, and the fuel/air mixture is then channeled into swozzle outlet chamber 352 for additional mixing. The fuel and air mixture is then channeled to mixing passage 354 prior to being discharged from assembly 300 into combustion chamber 311. In addition, diffusion fuel channeled through diffusion fuel passage 318 is discharged through gas injectors 364 into combustion chamber 311 wherein the diffusion fuel is mixed with, and combusts with, air discharged from air injectors 366.

Figure 4:
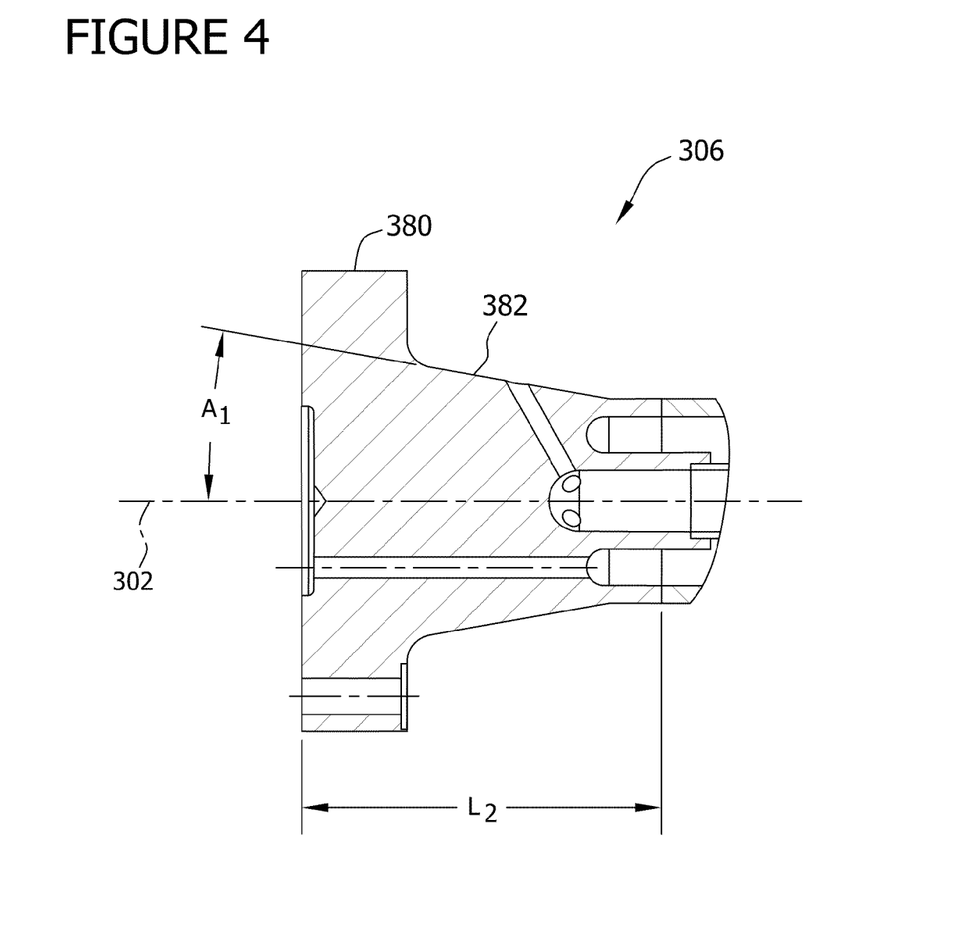
FIG. 4 is a cross-sectional schematic view of an exemplary flange used with the fuel nozzle assembly shown in FIG. 3.

FIG. 4 is a cross-sectional schematic view of flange 306 used with fuel nozzle assembly 300. In the exemplary embodiment, flange 306 is fabricated to operate between a whole number frequency multiple of the operating frequency of gas turbine engine 100. More specifically, and in the exemplary embodiment, gas turbine engine 100 operates at a frequency of approximately 50 Hz. Flange 306 is fabricated to operate at a natural frequency that will substantially avoid 50 Hz or multiples thereof, such as for example 100 hertz, 150 hertz, 200 hertz, etc. More specifically, in the exemplary embodiment, flange 306 is fabricated to operate at a natural frequency of about 175 Hz to about 180 Hz. The exemplary embodiment applies to a Class 9 Gas Turbine but can be applied to multiple engine classes such as Class 7 with a 60 Hz rotor tone with multiple rotor tones of 120 Hz, 180 Hz and 240 Hz.

To ensure fuel nozzle assembly 300 operates with a desired natural frequency, flange 306 is fabricated with a centerline axis 302 and includes a mounting portion 380 and a substantially frusto-conical shaped body 382 that together define an outside length $L_2$ for controlling the desired natural frequency. In the exemplary embodiment, body 382 is converged and is fabricated with an angle $A_1$ of approximately 10° to enable fuel nozzle assembly 300 to operate at a frequency of between about 175 Hz to about 180 Hz. In the exemplary embodiment, length $L_2$ is approximately 3.75 in. (95.25 mm) and enables fuel nozzle assembly 300 to operate at a frequency of between about 175 Hz to about 180 Hz. Alternatively, body 382 may be fabricated with any angle $A_1$, and length $L_2$ may be any length that enables fuel nozzle assembly 300 to function as described herein.

Figure 5:
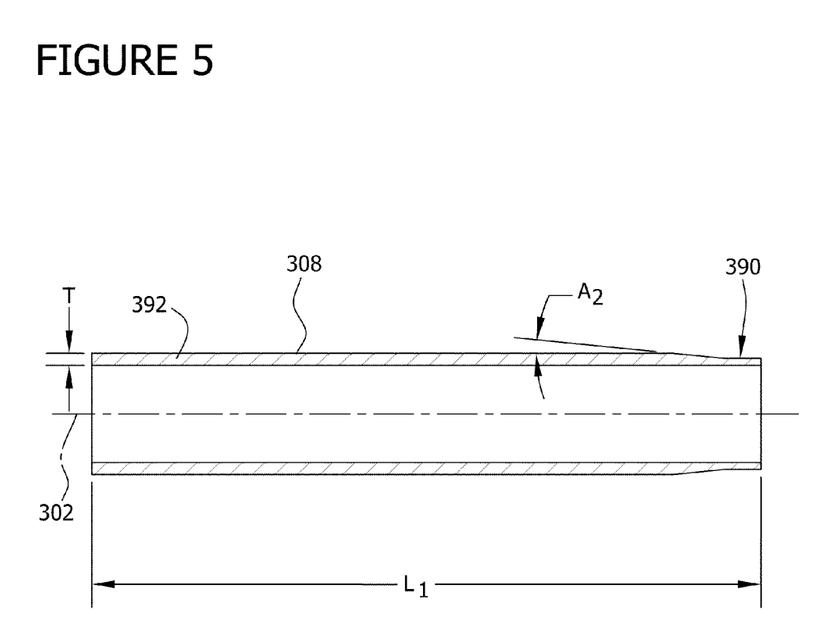
FIG. 5 is a cross-sectional schematic view of an exemplary premix tube used with the fuel nozzle assembly shown in FIG. 3.

FIG. 5 is a cross-sectional schematic view of premix tube 308. In the exemplary embodiment, premix tube 308 has a centerline axis 302 and is fabricated to operate at a frequency that is different than an operating frequency of gas turbine engine 100. More specifically, in the exemplary embodiment, premix tube 308 has a length $L_1$ of approximately 14 inches (in.) (357 millimeters (mm)), wherein premix tube 308 operates at a frequency that is different than an operating frequency of gas turbine engine 100 (shown in FIG. 1) i.e., 50 hertz or multiples thereof). Alternatively, $L_1$ may be any length that enables fuel nozzle assembly 300 to function as described herein.

In the exemplary embodiment, premix tube 308 includes a tapered portion 390 that enables a greater air flow through fuel nozzle assembly 300, and more specifically through swozzle assembly 340 (shown in FIG. 3). In the exemplary embodiment, tapered portion 390 is formed with at an angle $A_2$ of about 5°. Alternatively, tapered portion 390 may converge at any angle $A_2$ that enables fuel nozzle assembly 300 to function as described herein. Moreover, in the exemplary embodiment, premix tube 308 includes an outer wall 392 that has a thickness T of approximately 0.19 (in.) (4.76 (mm)). Alternatively, outer wall 392 may be formed with any thickness T that enables fuel nozzle assembly 300 to function as described herein.

Figure 6:
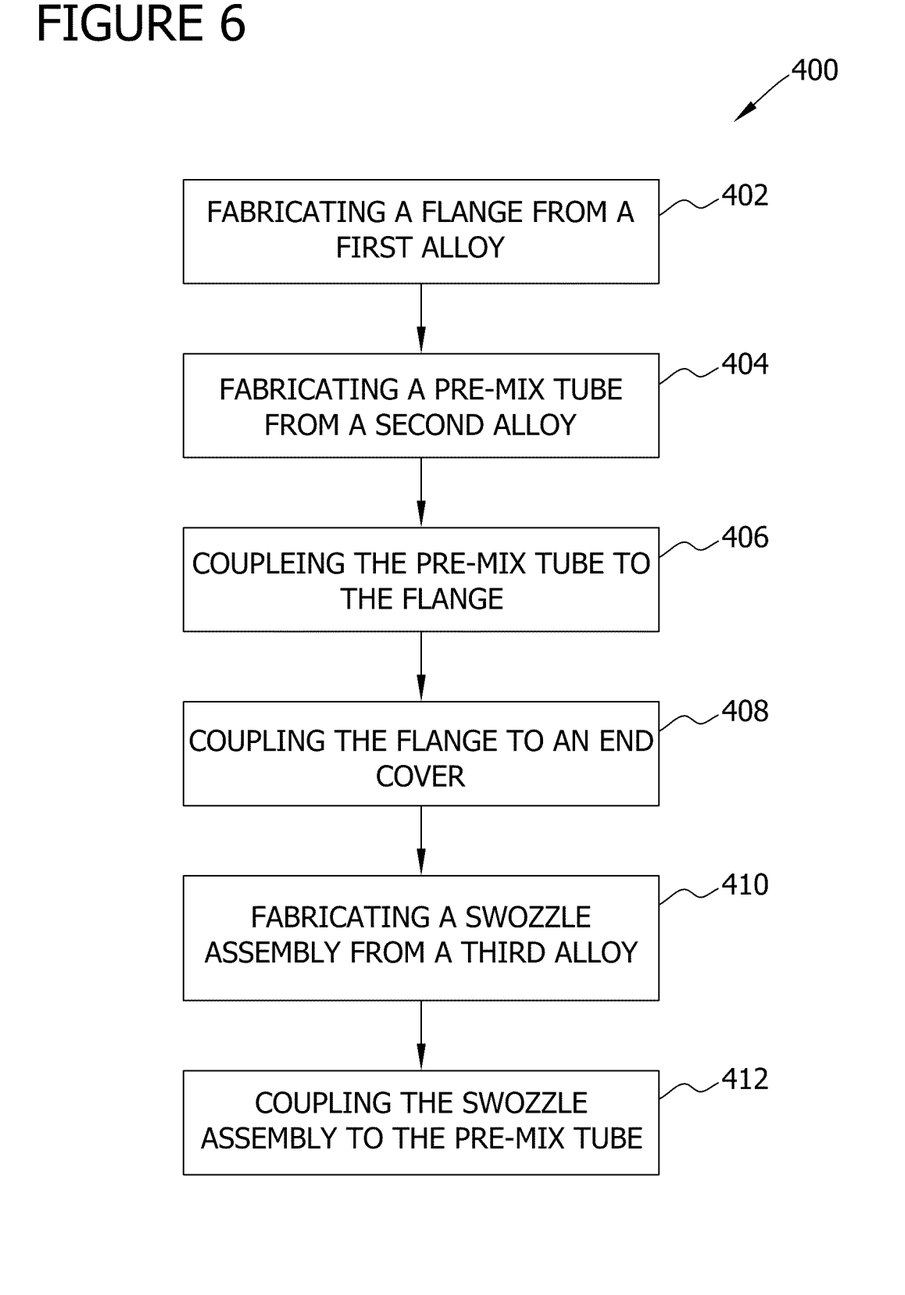
FIG. 6 is a flow diagram of an exemplary method of fabricating the fuel nozzle assembly shown in FIG. 3.

FIG. 6 is a flow diagram of an exemplary method 400 for use in fabricating fuel nozzle assembly 300 (shown in FIG. 3). In the exemplary embodiment, method 400 includes fabricating 402 flange 306 from stainless steel 410, fabricating 404 premix tube 308 from stainless steel 410 and coupling 406 premix tube 308 to flange 306 using an electron beam weld at joint 310. Flange 306 is then coupled 408 to end cover 304 using a plurality of fasteners (not shown). Using stainless steel 410 enables flange 306 and premix tube 308 to operate at a frequency that is different than a natural operating frequency of gas turbine engine 100, as described in more detail herein. Additionally, using stainless steel 410 increases the number of compression and expansion cycles that each component may undergo as compared the materials used in known fuel nozzle assemblies. As a result the life of each component is facilitated to be increased. Alternatively, flange 306 and premix tube 308 may be fabricated from any other material that enables fuel nozzle assembly 300 to function as described herein. Coupling flange 306 to premix tube 308 with an electron beam welded joint facilitates increasing a structural strength and a resilience of the fuel nozzle assembly and facilitates increasing the durability and life expectancy of the fuel nozzle assembly during engine operations.

Method 400 includes fabricating 410 swozzle assembly 340 from stainless steel 347 and coupling 412 swozzle assembly 340 to a downstream end 394 of premix tube 308 using an electron beam weld at joint 346. Using stainless steel 347 enables swozzle assembly 340, when coupled to premix tube 308 as described herein, to operate at a frequency that is different than the operating frequency of gas turbine engine 100, as described herein. Additionally, using stainless steel 347 facilitates increasing the number of compression and expansion cycles that swozzle assembly 340 may undergo as compared to known fuel nozzle assemblies, and as such facilitates increasing a useful life of the component. Alternatively, swozzle assembly 340 may be fabricated from any material that enables fuel nozzle assembly 300 to function as described herein. Coupling swozzle assembly 340 to premix tube 308 with an electron beam welded joint facilitates increasing a structural strength and a resilience of the fuel nozzle assembly and facilitates increasing the durability and life expectancy of the fuel nozzle assembly during engine operations.

Exemplary embodiments of fuel nozzle assemblies are described in detail above. The above-described systems are used to deliver a mixture of fuel and air to the engine's combustion chamber, and are fabricated to substantially balance the frequency margin within the engine while providing a more robust and resilient design immediately upstream from the combustion chamber. More specifically, the flange and premix tube within each fuel nozzle assembly integrates both a structural design and natural frequency tuning to facilitate optimizing the design to balance the frequency margin, low cycle fatigue (LCF), high cycle fatigue (HCF) capability and aerodynamic impact. Such fuel nozzle assemblies reduce stress concentrations, minimized break-out into fuel holes, and tune natural frequencies to provide adequate frequency margin with rotor speeds and combustion tones with minimized aerodynamic interference.

Moreover, the systems and method described herein eliminate the braze joint between the flange and premix tube by utilizing an electron beam welded joint to provide a stiffer, or resilient fuel nozzle assembly and increase the durability of the fuel nozzle assembly during engine operation. The contour of the flange and premix tube shape and wall thickness are manipulated to control and improve the natural frequency margin, LCF and HCF are optimized to provide a robust durable design to improve product life.

Additionally, the choice of materials used to fabricate the fuel nozzle assembly described herein significantly reduces costs associated with the production of such fuel nozzles. The materials used also increase the number of cycles that each component may undergo, thereby significantly increasing the life of each component.

Although the apparatus and methods described herein are described in the context of fuel nozzle assemblies for gas turbine engines, it is understood that the apparatus and methods are not limited to such applications. Likewise, the system components illustrated are not limited to the specific embodiments described herein, but rather, system components can be utilized independently and separately from other components described herein.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of assembling a fuel nozzle assembly for a gas turbine engine having a natural operating frequency, said method comprising:

providing a flange that is fabricated from a first alloy and that has a pre-determined length that facilitates raising a first frequency of the flange during operation above the natural operating frequency of the gas turbine engine, wherein the flange includes a mounting portion and a substantially frusto-conical shaped body that enables the flange to exhibit the first frequency, the substantially frusto-conical shaped body coupled to the mounting portion;

configuring the flange such that a multiple of the first frequency is different than a multiple of the natural operating frequency of the gas turbine engine;

providing a premix tube that is fabricated from a second alloy such that the premix tube is configured to exhibit a second frequency that is different from the natural operating frequency of the gas turbine engine, wherein the premix tube includes a premixed fuel supply passage; and coupling the premix tube to the flange.

2. A method in accordance with claim 1 further comprising providing a swozzle assembly that is fabricated from stainless steel and coupling the swozzle assembly to a downstream end of the premix tube.

3. A method in accordance with claim 1, wherein coupling the premix tube to the flange further comprises welding the premix tube to the flange.

4. A method in accordance with claim 1 further comprising coupling the flange to a combustor end cover surface.

5. A method in accordance with claim 1, wherein coupling the premix tube to the flange further comprises coupling the premix tube to the flange such that the coupled premix tube and flange are configured to exhibit a frequency that is higher than the natural operating frequency of the gas turbine engine.

6. A method in accordance with claim 1 further comprising:

coupling an end cap assembly and a swirler assembly to the pre-mix tube; and coupling a gas tip to the swirler assembly, wherein the gas tip includes a plurality of gas injectors and air injectors.

7. A fuel nozzle assembly for a gas turbine engine including a combustor, the gas turbine engine having a natural operating frequency, said fuel nozzle assembly comprising:

a flange comprising a mounting portion at a first end and a substantially frusto-conical shaped body at a second end, wherein said flange first end is coupled to the combustor, said flange fabricated from a first alloy and having a pre-determined length that facilitates raising a first frequency of said flange during operation above the natural operating frequency of the gas turbine engine, wherein a multiple of the first frequency is different than a multiple of the natural operating frequency of the gas turbine engine; and a premix tube comprising a premixed fuel supply passage and a first end coupled to said flange second end, said premix tube fabricated from a second alloy such that said premix tube is configured to exhibit a second frequency that is different than the natural operating frequency of the gas turbine engine.

8. A fuel nozzle assembly in accordance with claim 7 further comprising a swozzle assembly coupled to a downstream end of said premix tube.

9. A fuel nozzle assembly in accordance with claim 8, wherein said swozzle assembly is fabricated from stainless steel.

10. A fuel nozzle assembly in accordance with claim 7, wherein said premix tube and said flange define a weld interface.

11. A gas turbine engine having a natural operating frequency, said gas turbine engine comprising:

a combustor; and
a fuel nozzle assembly comprising:
a flange comprising a mounting portion at a first end and a substantially frusto-conical shaped body at a second end, said flange fabricated from a first alloy and having a pre-determined length that facilitates raising a first frequency of said flange during operation above the natural operating frequency of said gas turbine engine, wherein said flange is coupled to said combustor at said flange first end, wherein a multiple of the first frequency is different than a multiple of the natural operating frequency of the gas turbine engine; and a premix tube comprising a premixed fuel supply passage and a first end coupled to said flange second end, said premix tube fabricated from a second alloy such that said premix tube is configured to exhibit a second frequency that is different than the natural operating frequency of said gas turbine engine.

12. A gas turbine engine in accordance with claim 11 further comprising a swozzle assembly coupled to a downstream end of said premix tube.

13. A gas turbine engine in accordance with claim 12, wherein said swozzle assembly is fabricated from stainless steel.

14. A gas turbine engine in accordance with claim 11, wherein said premix tube and said flange define a weld interface.

* * * * *